(No Model.)

A. J. NICHOLS.
KNOT TYING DEVICE.

No. 581,240. Patented Apr. 20, 1897.

Witnesses:
Walter E. Lombard
A. C. Harmon

Inventor:
Ambrose J. Nichols,
by Crosby Gregory
Attys.

UNITED STATES PATENT OFFICE.

AMBROSE J. NICHOLS, OF NEW MARKET, NEW HAMPSHIRE, ASSIGNOR OF ONE-HALF TO GEORGE DRAPER & SONS, OF HOPEDALE, MASSACHUSETTS.

KNOT-TYING DEVICE.

SPECIFICATION forming part of Letters Patent No. 581,240, dated April 20, 1897.

Application filed October 28, 1896. Serial No. 610,347. (No model.)

*To all whom it may concern:*

Be it known that I, AMBROSE J. NICHOLS, of New Market, county of Rockingham, State of New Hampshire, have invented an Improvement in Knot-Tying Devices, of which the following description, in connection with the accompanying drawings, is a specification, like letters on the drawings representing like parts.

It is customary in cotton-mills for the spooler-tenders to unite the broken ends of yarn between the bobbin and spool by tying them in a quickly and easily made but large knot, the long free ends sticking out on the same side of the knot. Such a knot is very objectionable, as it makes a large bunch in, and which is very likely, in fact almost sure, to cause breakage of, the yarn in its subsequent passage through the harness or reed on the loom. The knot known as the "weavers'" knot is of much smaller size and leaves shorter ends on opposite sides of the knot, and sometimes such form of knot is insisted upon, but it requires time to perform the operation with the fingers and hence diminishes the product of the spooler.

This invention has for its object the production of a simple device which greatly assists the operator in tying a knot and simplifies the formation of a weaver's knot.

The device serves to hold one end of the yarn, preferably that from the bobbin, while the operative forms a slip-noose in the end depending from the spool around the held end and draws the noose off of the yarn-holder onto and tightens it upon the projecting part of the held end, forming the well-known weavers' knot.

Figure 1:
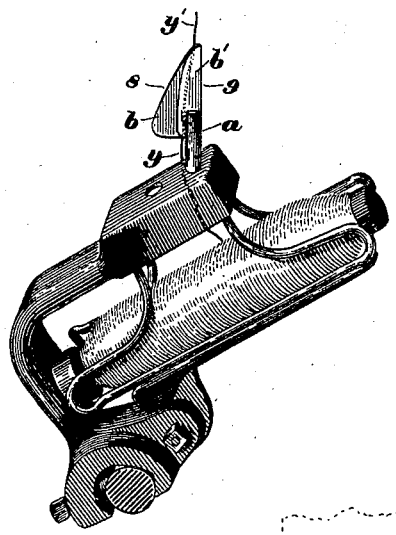
Figure 3:
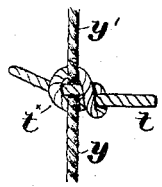
Figure 2:
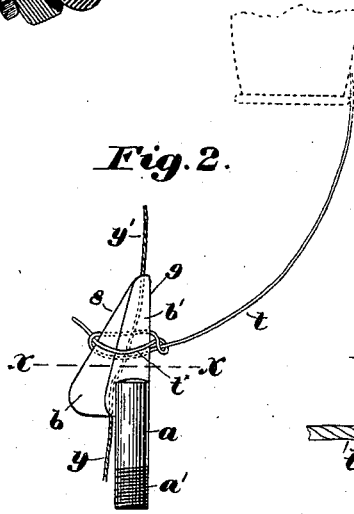
Figure 7:
Figure 6:
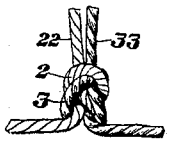
Figure 5:
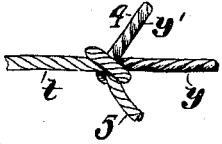
Figure 4:
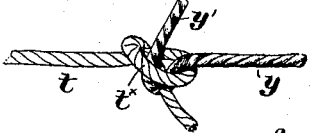

Figure 1, in perspective, represents a bobbin-holder in general use on spooling-machines with my invention applied thereto. Fig. 2 shows the device in use with the slip-noose formed in the end of yarn from the spool and slipped loosely over said device. Fig. 3 is an enlarged view of the two yarn ends just before the knot is drawn taut. Fig. 4 is a similar view showing the knot as partially tightened. Fig. 5 is an enlarged view of the tightened knot. Fig. 6 is a similar view of the objectionable form of knot generally used; and Fig. 7 is a transverse sectional view of the knot-tying device on the line $x\ x$, Fig. 2.

Referring first to Fig. 6, it is seen that the two loose ends have been placed side by side and passed through the double bight 2 3, the free ends 22 33 sticking out from the same side of the large bunch formed by the knot, a most objectionable form, for the reasons set forth.

In Fig. 5 the completed or tightened weavers' knot is shown, wherein the two loose ends 4 5 extend from opposite sides of the small knot, a form of knot which has been found in practice the best for uniting yarn ends. The operation of tying such a knot solely by the fingers is difficult to describe and consists in a somewhat elaborate method of manipulating the ends, but the same result is attained by simply pulling taut a slip-noose around a free end. My invention facilitates such operation by holding one end of the yarn and at the same time providing a support for the slip-noose, the shape of the support being such that the act of tightening the noose draws it off the support and around the held end of the yarn.

The device consists of a shank $a$, preferably screw-threaded, as at $a'$, Fig. 2, by which it may be inserted in the bobbin-holder in upright position, as shown in Fig. 1, the shank having secured thereto a preferably sheet-metal top folded upon itself longitudinally to form two leaves $b\ b'$ of a substantially spear-shaped head, the leaf $b$ being the broader in order to project beyond the leaf $b'$ and form a guide for the yarn when introducing it between the leaves. A deep groove $b^\times$, Fig. 7, is formed by the folding between the leaves, the sides converging to the bottom thereof, whereby a yarn end, as $y$, Figs. 1 and 2, can be quickly drawn thereinto and held with its tip $y'$ projecting above the holder. The longitudinal edges 8 9 of the head converge toward the apex of the device, and they act to shed the slip-noose $t^\times$, made in the end $t$ of yarn hanging from the spool.

When a yarn breaks, the attendant draws the end $y$ from the bobbin against the broader leaf $b$, which guides it into the groove $b^\times$, and the attendant then forms a slip-noose $t^\times$ in the other end $t$ of yarn, slipping it over the head of the device, as shown in Fig. 2, and by pulling oppositely on the ends of the noose the latter is tightened and at the same time slides toward the apex of the head and off from it onto the tip end $y'$ of the held end.

The partially-tightened slip-noose is shown in Fig. 3 surrounding the tip $y'$ of the held end, and in Fig. 4 the knot is shown just prior to its completion in the regular weavers' knot, Fig. 5.

When the knot is made, a slight outward pull releases the held end of yarn and the spooling is resumed. The holder thus serves to hold one end of the yarn as well as to support and guide the slip-noose formed in the other yarn end, the act of tightening the noose also drawing it from the head of the holder onto the tip of the held end.

By the device described the formation of weavers' knots is greatly facilitated and simplified.

Were it not for the unequal width of the leaves it would require considerable care on the part of the attendant to guide the yarn properly into the groove between them.

It will be understood that the yarns are greatly exaggerated in size in Figs. 2 to 6, inclusive, of the drawings, in order to more clearly show the construction and formation of the knots.

Having fully described my invention, what I claim, and desire to secure by Letters Patent, is—

1. A knot-tying device having sides or leaves of unequal width and provided with a groove or notch extending longitudinally between said leaves to hold a yarn end, and having the longitudinal edges of the leaves converging toward the apex, substantially as and for the purpose set forth.

2. A knot-tying device having leaves of unequal width with their longitudinal edges converging toward the apex of the device, and provided with a V-shaped yarn-holding groove or notch between them along one of said edges, to hold one end of yarn and form a support for a slip-noose in the other end and a support for the leaves, substantially as described.

3. A knot-tying device comprising a threaded shank, and a spear-shaped sheet-metal head bent upon itself longitudinally to form two leaves of unequal width with a V-shaped groove between them adapted to hold one end of yarn, the broader leaf guiding the yarn end into the grooves, the head supporting a slip-noose formed in the other yarn end, whereby tightening of the noose withdraws it from the head and around the projecting portion of the yarn end held thereby, substantially as described.

In testimony whereof I have signed my name to this specification in the presence of two subscribing witnesses.

AMBROSE J. NICHOLS.

Witnesses:
F. E. TUTTLE,
T. M. JOY.